US005604470A

United States Patent [19]

Atokawa

[11] Patent Number: 5,604,470

[45] Date of Patent: Feb. 18, 1997

[54] DUPLEXER HAVING TRANSMIT AND RECEIVE SECTIONS MOUNTED ON A SINGLE SUBSTRATE

[75] Inventor: Masayuki Atokawa, Ishikawa-ken, Japan

[73] Assignee: Murata Manufacturing Co., Ltd., Japan

[21] Appl. No.: 422,143

[22] Filed: Apr. 13, 1995

[30] Foreign Application Priority Data

Apr. 26, 1994 [JP] Japan .................................... 6-088524

[51] Int. Cl.$^6$ ............................... H01P 1/213; H04B 1/50

[52] U.S. Cl. .......................... 333/126; 333/129; 333/134; 455/82; 455/83; 455/84

[58] Field of Search .................................... 333/124–129, 333/132, 134, 136, 1.1, 24.2; 455/73, 79, 80, 82–84, 90; 370/24

[56] References Cited

U.S. PATENT DOCUMENTS

| | | | |
|---|---|---|---|
| 5,015,973 | 5/1991 | Kawakami et al. | 333/132 |
| 5,023,866 | 6/1991 | De Muro | 370/24 |
| 5,068,629 | 11/1991 | Nishikawa et al. | 333/24.2 X |
| 5,293,141 | 3/1994 | Kobayashi et al. | 333/134 X |

FOREIGN PATENT DOCUMENTS 2282029 3/1994 United Kingdom .

OTHER PUBLICATIONS

Patent Abstract of Japan: vol. 4, No. 189 JP-A55-132103 (Shimada Rika Kogyo K.K.) 14 Oct., 1980.

Patent Abstract of Japan: vol. 17 No. 128 JP-A04-304003 (Murata Mfg Co. Ltd) 27 Oct., 1992.

Patent Abstract of Japan: vol. 15 No. 219 JP-A03-062626 (NEC Corp.) 18 Mar., 1991.

Patent Abstract of Japan: vol. 11 No. 51 JP-A61-214625 (Tokyo Electric Co Ltd.) 24 Sep., 1986.

*Primary Examiner*—Paul Gensler

*Attorney, Agent, or Firm*—Majestic, Parsons, Siebert & Hsue

[57] ABSTRACT

A duplexer usable for both transmission and reception in a mobile communication apparatus such as a car phone has both its transmission section and reception section mounted on a single substrate. The transmission section is connected between an input terminal and an antenna terminal and includes an isolator and either a circuit having only inductors and capacitors or a trap circuit having a dielectric resonator and an inductor and a Π-type low-pass filter having an inductor and capacitors. The reception section is comprised of a filter using dielectric resonators.

14 Claims, 2 Drawing Sheets

DUPLEXER HAVING TRANSMIT AND RECEIVE SECTIONS MOUNTED ON A SINGLE SUBSTRATE

BACKGROUND OF THE INVENTION

This invention relates to a duplexer, usable in a mobile communication apparatus such as a car phone and a portable phone, for allowing a single antenna to be used for both transmission and reception of signals.

There is a trend for compactness and high-density mounting in mobile communication apparatus such as portable telephones, and the progress is in the direction of digital systems. Under these circumstances, there are increased demands for compactness and high-density mounting for the components which are used in such apparatus.

An antenna circuit for an apparatus such as a portable telephone is generally structured, as shown in FIG. 4, by connecting an isolator ISO to a duplexer, the duplexer being composed of a transmission filter and a reception filter and the isolator being connected to the input terminal of its transmission section. FIG. 5 shows a circuit diagram of a duplexer for a prior art mobile communication apparatus such as a portable analog telephone using dielectric resonators. Its transmission section comprises a band elimination filter using two dielectric resonators $R_1$ and $R_2$ as well as capacitors $C_1$–$C_5$ and inductors $L_1$ and $L_3$, and its reception section comprises a two-stage bandpass filter using two dielectric resonators $R_3$ and $R_4$ as well as capacitors $C_6$–$C_8$. An antenna terminal ANT in the middle is connected to an antenna. The inductor $L_1$ and the capacitors $C_1$ and $C_2$ together form a II-type low-pass filter adapted to adjust the phase at the antenna terminal ANT of the band elimination filter such that the reflection phase becomes open in the pass band of the bandpass filter in the reception section. The dielectric resonators $R_1$–$R_4$, capacitors $C_1$–$C_8$ and inductors $L_1$–$L_3$ are mounted on a single substrate to form a duplexer of a unified structure and, when it is used in an apparatus such as a portable telephone, such a duplexer and an isolator are mounted separately on a circuit board.

Thus, a prior art duplexer has a transmission section having a filtering function with large attenuation in the pass band of the reception section, and use is therefore made of a dielectric filter with large attenuation comprising a plurality of dielectric resonators. Thus, many dielectric resonators, capacitance-providing elements and inductance-providing elements such as coils were required. This makes it difficult to provide a compact duplexer, and since these many elements must be properly arranged and soldered, not only the cost of components but the cost of production is increased. Moreover, such a prior art duplexer has the problem of a large insertion loss.

SUMMARY OF THE INVENTION

It is therefore an object of this invention to eliminate the problems as described above of prior art duplexers and to provide an improved duplexer with a small loss, which is composed of an isolator and a fewer components, can be produced at a reduced cost and in a compact form, can be mounted on a circuit board easily and requires a reduced area for mounting.

A duplexer embodying this invention, with which the above and other objects can be accomplished, may be characterized as having its transmission section formed with an isolator and a circuit having only inductors and capacitors, and its reception section comprised of a filter using dielectric resonators, both the transmission and reception sections, inclusive of the isolator, being mounted on a single substrate to form a unitary structure. The circuit having only inductors and capacitors in the transmission section is formed as a combination of a series-connected resonance circuit with an inductor and a capacitor and a II-type low-pass filter having an inductor and capacitors.

The transmission section may alternatively be comprised of an isolator, a trap circuit including a single dielectric resonator and a capacitor, and a II-type low-pass filter having an inductor and capacitors.

With a duplexer thus formed, fewer components are required because its transmission section includes no dielectric resonators or only one dielectric resonator, and a compact duplexer with a low loss can be realized.

BRIEF DESCRIPTION OF THE DRAWINGS

The accompanying drawings, which are incorporated in and form a part of this specification, illustrate embodiments of the invention and, together with the description, serve to explain the principles of the invention. In the drawings.

Throughout herein, components which are equivalent although belonging to different duplexers are indicated by the same symbols for convenience.

DETAILED DESCRIPTION OF THE INVENTION

Figure 1:
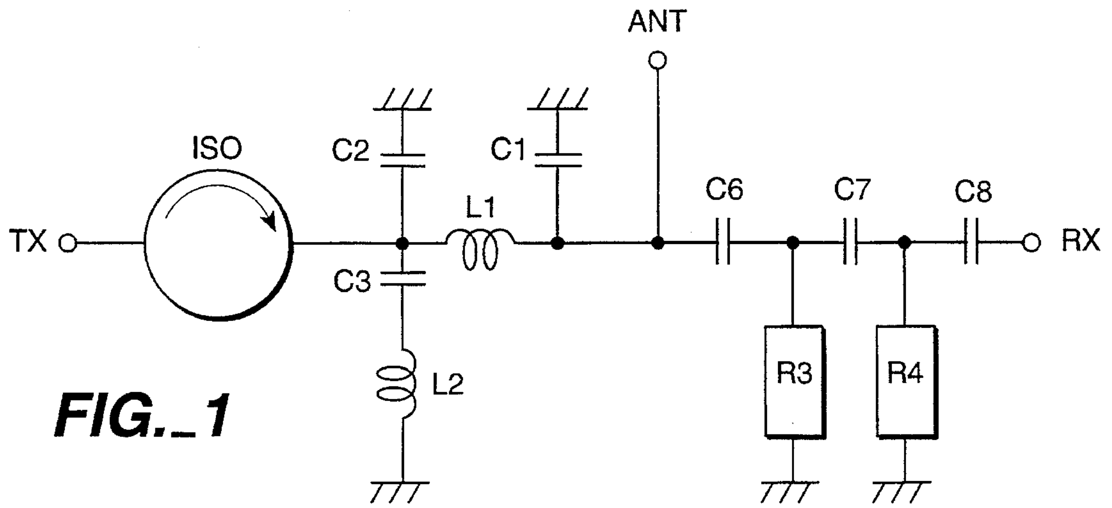
FIG. 1 is a circuit diagram of a duplexer embodying this invention.

As shown in FIG. 1, a duplexer according to this invention has a bandpass filter in its reception section formed with capacitors $C_7$, $C_8$ and $C_6$ inserted respectively between two dielectric resonators $R_3$ and $R_4$, between the dielectric resonator $R_4$ and an output terminal RX, and between the dielectric resonator $R_3$ and an antenna terminal ANT. In its transmission section, an isolator ISO (such as disclosed in U.S. Pat. No. 5,068,629) is connected to an input terminal TX, and a II-type low-pass filter comprised of an inductor $L_1$ and capacitors $C_1$ and $C_2$ and a series-connected trap circuit comprising an inductor $L_2$ and a capacitor $C_3$ are connected between the isolator ISO and the antenna terminal ANT.

The main function of this II-type low-pass filter comprised of the inductor $L_1$ and capacitors $C_1$ and $C_2$ and the series-connected trap circuit comprising the inductor $L_2$ and the capacitor $C_3$ is to adjust the phase such that the reflection phase in the passband of the band pass filter at a receiving station becomes open at the antenna terminal ANT. In other words, the circuit in the transmission section described above is for the purpose of matching the isolator with the reception filter, and not for obtaining attenuation inside the passband, at the receiving station.

Figure 5:
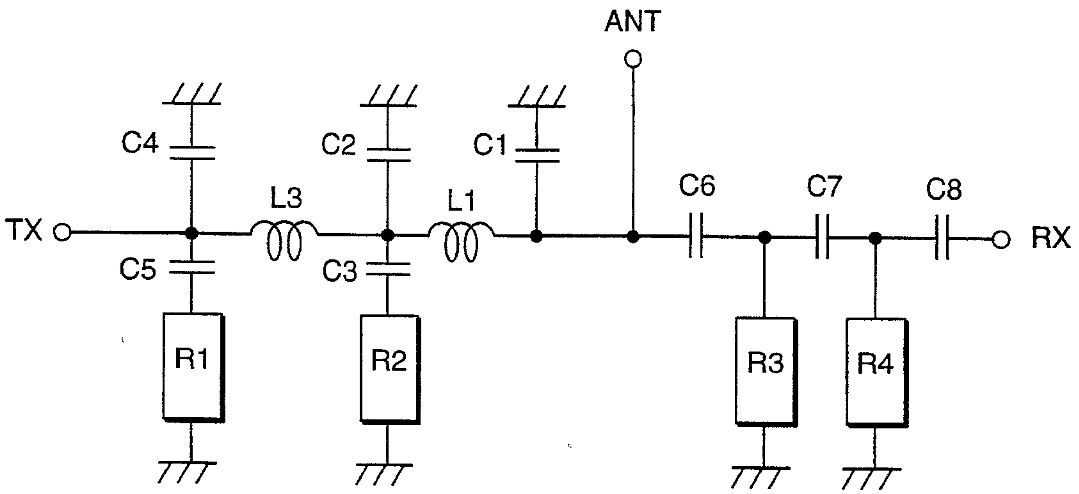
FIG. 5 (PRIOR ART)
FIG. 5 is a circuit diagram of a prior art duplexer.

In summary, the circuit according to this embodiment of the invention is obtained by replacing the prior art filter circuit using dielectric resonators (as shown in FIG. 5) by a circuit having only inductors and capacitors, and this has become possible because attenuation inside the passband at the receiving station is unnecessary in the case of a duplexer comprising a transmission filter and a reception filter used for a digital portable telephone, etc.

Figure 2:
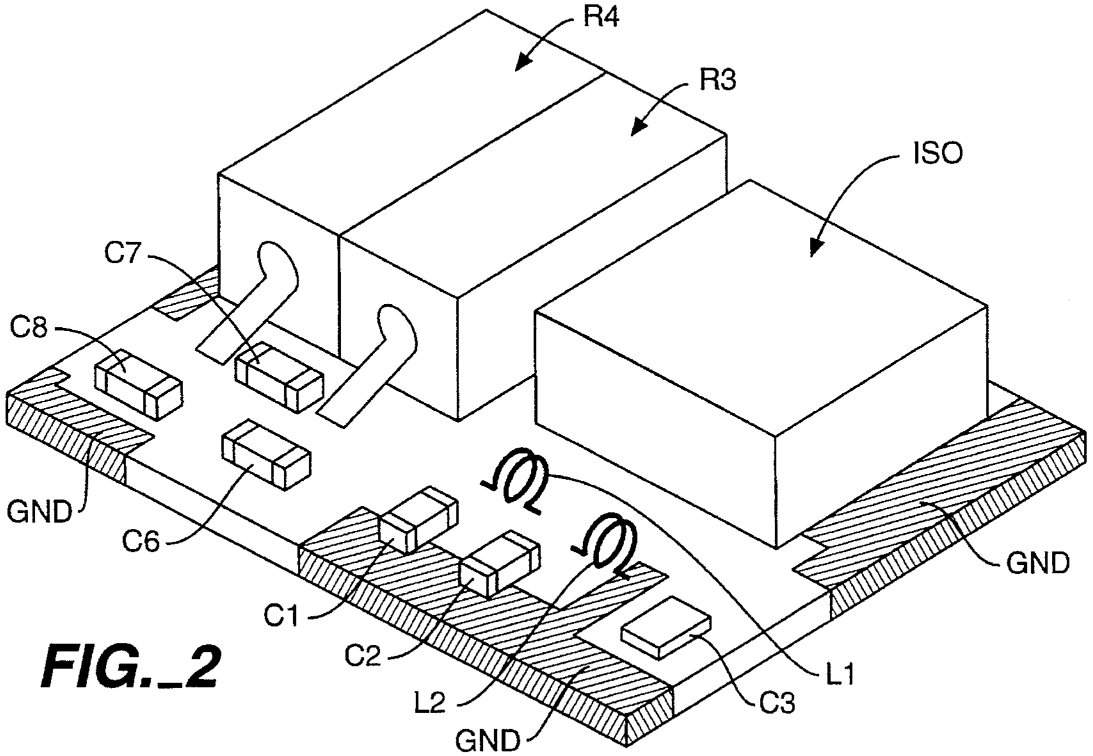
FIG. 2 is a diagonal external view of the duplexer of FIG. 1 mounted on a substrate.

A duplexer as shown in FIG. 1 is formed according to this invention by mounting the isolator ISO, the dielectric resonators $R_3$ and $R_4$, inductors $L_1$ and $L_2$ and capacitors $C_1$–$C_3$ and $C_6$–$C_8$ on a single substrate, as shown in FIG. 2. Grounding electrodes GND are formed as wiring patterns both on the upper and lower surfaces of the substrate (although the bottom surface is not separately illustrated). Similarly, although not shown in FIG. 2, terminals for connections, as well as input and output electrodes are formed also as wiring patterns on the upper and lower surfaces of the substrate.

In summary, a duplexer according to this embodiment of the invention is characterized as having a simplified circuit in the transmission section and being a unified structure including an isolator. Since the transmission section can thus be formed without using a dielectric resonator and an isolator is included as a part of the unified structure, not only dielectric resonators but also inductors and capacitors which would be required to be connected to such dielectric resonators to form a filter are no longer required. As a result, the total number of components to be assembled (and soldered) is reduced and the insertion loss can also be reduced according to this invention.

Figure 3:
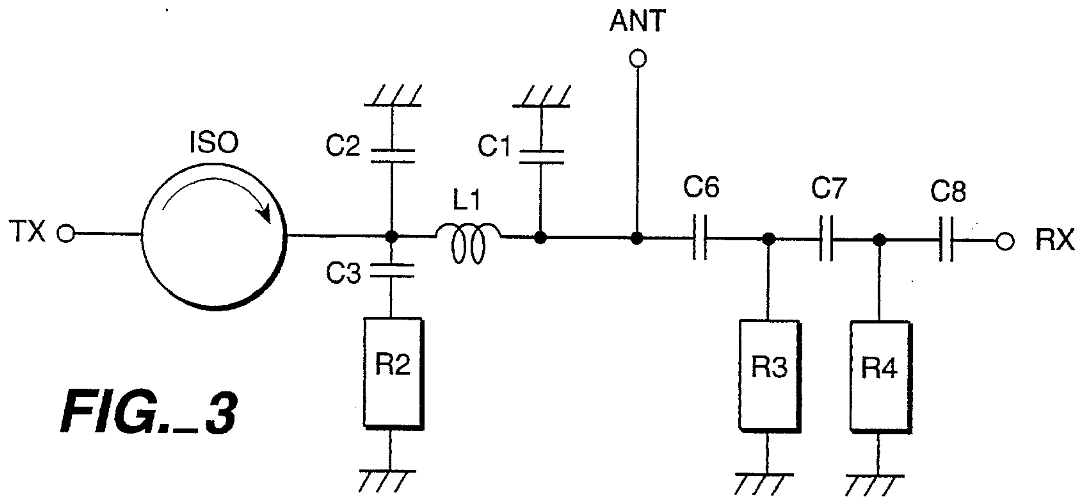
FIG. 3 is a circuit diagram of another duplexer according to another embodiment of the invention.
Figure 4:
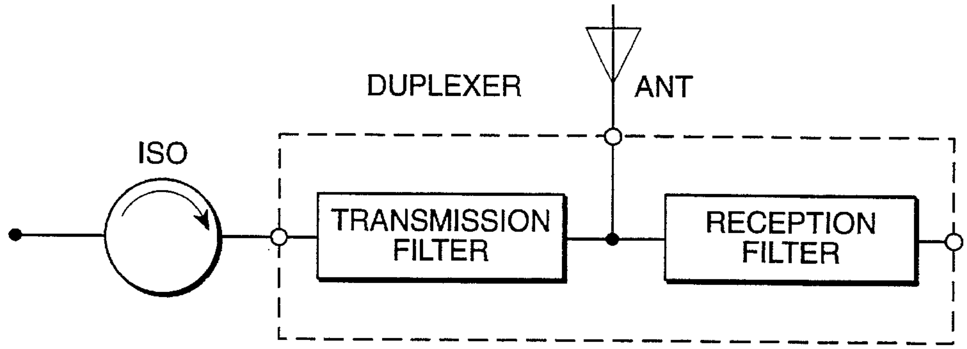
FIG. 4 (PRIOR ART)
FIG. 4 is a schematic diagram showing the general structure of a duplexer.

FIG. 3 shows another duplexer embodying this invention characterized as having its transmission section formed by connecting an isolator ISO to an input terminal TX and connecting a Π-type low-pass filter comprised of an inductor $L_1$ and capacitors $C_1$ and $C_2$ and a series-connected trap circuit comprising a dielectric resonator $R_2$ and a capacitor $C_3$ between the isolator ISO and the antenna terminal ANT. Its reception section is structured as explained above witch reference to FIG. 1. In other words, the duplexer shown in FIG. 3 may be described as using the dielectric resonator $R_2$ in the place of the inductor $L_2$ of FIG. 1. Thus, the circuit for the transmission section composed of the inductor $L_1$, capacitors $C_1$, $C_2$ and $C_3$ and the dielectric resonator $R_2$ is for the purpose of matching the isolator in the transmission section with the receiving circuit at a receiving station.

As explained above, a duplexer according to the second embodiment of the invention is characterized wherein its transmission section does not have the filtering function obtainable with a plurality of dielectric resonators which were necessary in prior art duplexer for obtaining attenuation. Instead, the transmission section includes only one dielectric resonator, and it is for the purpose of matching. Thus, the transmission section is much simplified as compared to prior art duplexers.

Although not separately illustrated, a duplexer according to this invention, Of which the circuit diagram is shown in FIG. 3, is characterized in that all these components shown in FIG. 3, inclusive of the isolator, are mounted on a single substrate, as shown in FIG. 2. Since use is made of a single substrate and the transmission section includes only one dielectric resonator for matching, the total number of components, as well as the insertion loss, can be reduced also according to this embodiment of this invention.

Although this invention has been described above in terms of only a limited number of examples, the invention is not intended to be limited by these illustrated examples. Many modifications and variations are possible within the scope of the invention. For example, although the illustrated examples included a two-stage resonator apparatus for the reception section, the circuit for the reception section may be formed with a single-stage dielectric resonator or a multistage resonator apparatus with three or more stages. The manner of connecting the resonators is not intended to limit the scope of the invention. As another example, although a plurality of dielectric resonators, each comprising a dielectric block having a throughhole serving as a resonator, are used as a filter for the reception section in the illustrated examples, use may equally well be made of a dielectric resonator apparatus (or dielectric filter) comprising a single dielectric block having a plurality of throughholes serving as resonators. In summary, all such modifications and variations that are obvious to a person skilled in the art are intended to be within the scope of the invention. Duplexers according to this invention are finally characterized as having a simplified circuit for its transmission section and every component inclusive of an isolator mounted on a single substrate such that they can be easily mounted on a circuit board for an apparatus such as a portable telephone and the cost of the mounting can be reduced. Since the transmission section can be formed without using any dielectric resonator or only one dielectric resonator, furthermore, the total number of the components can be reduced significantly. As a result, the insertion loss is reduced, the duplexer can be made compact and the cost of parts as well as the overall production cost can be significantly reduced.

What is claimed is:

1. A duplexer comprising:

a transmission section consisting of an isolator and a transmission circuit devoid of any resonators and comprising inductors and capacitors;

a reception section comprising a reception filter having a dielectric resonator apparatus; and a single substrate on which said transmission and reception sections are mounted, said transmission circuit functioning to match said isolator with said reception filter.

2. The duplexer of claim 1 wherein said transmission section consists of said isolator and a transmission circuit consisting of inductors and capacitors, wherein said reception section consists of said reception filter, and wherein said reception filter consists of dielectric resonators and capacitors.

3. The duplexer of claim 2 wherein said inductors and capacitors of said transmission circuit are connected such that said transmission circuit comprises a $\pi$-type low-pass filter having an inductor and capacitors and a series-connected resonance circuit having an inductor and a capacitor.

4. The duplexer of claim 2 further comprising an antenna terminal, an input terminal and an output terminal, said transmission section being connected between said antenna terminal and said input terminal, said reception section being connected between said antenna terminal and said output terminal.

5. The duplexer of claim 4 wherein said inductors and capacitors of said transmission circuit are connected such that said transmission circuit comprises a $\pi$-type low-pass filter having an inductor and capacitors and a series-connected resonance circuit having an inductor and a capacitor.

6. The duplexer of claim 1 further comprising an antenna terminal, an input terminal and an output terminal, said transmission section being connected between said antenna terminal and said input terminal, said reception section being connected between said antenna terminal and said output terminal.

7. The duplexer of claim 6 wherein said inductors and capacitors of said transmission circuit are connected such that said transmission circuit comprises a $\pi$-type low-pass filter having an inductor and capacitors and a series-connected resonance circuit having an inductor and a capacitor.

8. The duplexer of claim 1 wherein said inductors and capacitors of said transmission circuit are connected such that said transmission circuit comprises a π-type low-pass filter having an inductor and capacitors and a series-connected resonance circuit having an inductor and a capacitor.

9. The duplexer of claim 1 further comprising grounding electrodes formed on surfaces of said single substrate.

10. A duplexer comprising:

a transmission section comprising an isolator, a trap circuit having a single dielectric resonator and a capacitor, and a π-type low-pass filter having an inductor and capacitors;

a reception section comprising a reception filter having a dielectric resonator apparatus; and a single substrate on which said transmission and reception sections are mounted, said transmission circuit functioning to match said isolator with said reception filter.

11. The duplexer of claim 10 wherein said reception section consists of said reception filter, and wherein said reception filter consists of dielectric resonators and capacitors.

12. The duplexer of claim 11 further comprising an antenna terminal, an input terminal and an output terminal, said transmission section being connected between said antenna terminal and said input terminal, said reception section being connected between said antenna terminal and said output terminal.

13. The duplexer of claim 10 further comprising an antenna terminal, an input terminal and an output terminal, said transmission section being connected between said antenna terminal and said input terminal, said reception section being connected between said antenna terminal and said output terminal.

14. The duplexer of claim 10 further comprising grounding electrodes formed on surfaces of said single substrate.

* * * * *